No. 616,466. Patented Dec. 27, 1898.
T. F. HUTCHINSON.
MULTIPLE COTTON GIN.
(Application filed July 9, 1897.)
(No Model.) 4 Sheets—Sheet 1.

Witnesses.
J. H. Coleman
Archie G. Reese

Inventor.
Thomas F. Hutchinson
by
Frank L. Dyer
Attorney.

THE NORRIS PETERS CO., PHOTO-LITHO., WASHINGTON, D. C.

No. 616,466. Patented Dec. 27, 1898.
T. F. HUTCHINSON.
MULTIPLE COTTON GIN.
(Application filed July 9, 1897.)
(No Model.) 4 Sheets—Sheet 2.

Witnesses:

Inventor.
Thomas F. Hutchinson
by Frank L. Dyer
Attorney.

No. 616,466. Patented Dec. 27, 1898.
T. F. HUTCHINSON.
MULTIPLE COTTON GIN.
(Application filed July 9, 1897.)
(No Model.) 4 Sheets—Sheet 3.

Witnesses.
J. P. Coleman
Archie G. Reese

Inventor.
Thomas F. Hutchinson
by Frank L. Dyer
Attorney.

THE NORRIS PETERS CO., PHOTO-LITHO., WASHINGTON, D. C.

No. 616,466. Patented Dec. 27, 1898.
T. F. HUTCHINSON.
MULTIPLE COTTON GIN.
(Application filed July 9, 1897.)

(No Model.) 4 Sheets—Sheet 4.

Witnesses. Inventor.

UNITED STATES PATENT OFFICE.

THOMAS F. HUTCHINSON, OF CHICAGO, ILLINOIS, ASSIGNOR TO THE AMERICAN COTTON COMPANY, OF NEW YORK, N. Y.

MULTIPLE COTTON-GIN.

SPECIFICATION forming part of Letters Patent No. 616,466, dated December 27, 1898.

Application filed July 9, 1897. Serial No. 644,005. (No model.)

*To all whom it may concern:*

Be it known that I, THOMAS F. HUTCHINSON, a citizen of the United States, residing at Chicago, in the county of Cook and State of Illinois, have invented certain new and useful Improvements in Multiple Cotton-Gins; and I do hereby declare the following to be a full, clear, and exact description of the invention, which will enable others skilled in the art to which it appertains to make and use the same.

My invention relates to various new and useful improvements in multiple cotton-gins; and the objects of the invention are to improve the construction and method of operation of gins of that type.

The invention comprises, essentially, a plurality of gangs of saws mounted in substantially the same, preferably horizontal, plane and combined with improved mechanism for feeding the seed-cotton to the saws and for carrying off the seed and foreign substances removed from the cotton during the ginning operation, as well as in details of construction to be more fully hereinafter described and claimed.

In order that my invention may be better understood, attention is directed to the accompanying drawings, forming a part of this specification, and in which—

Figure 1:
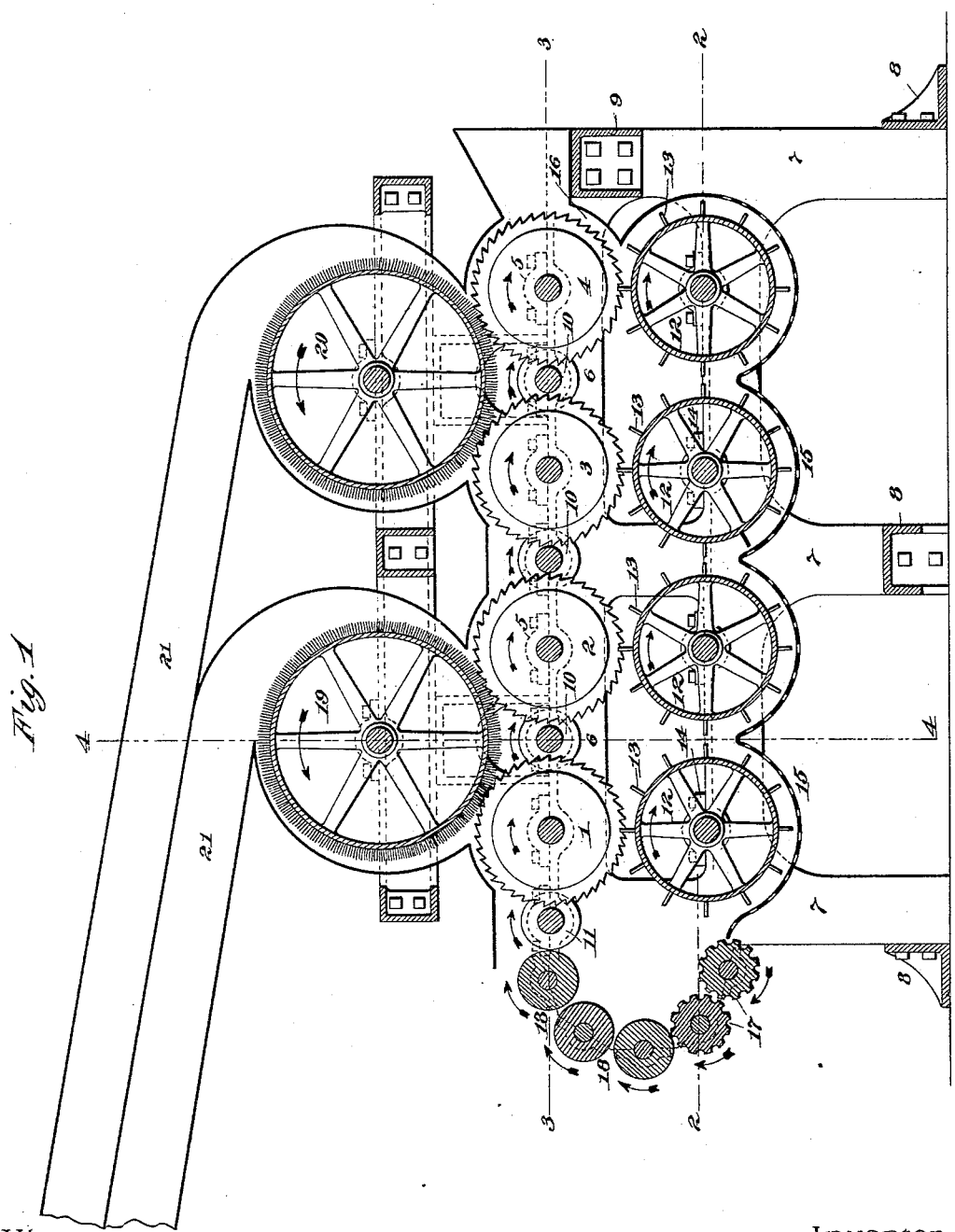
Figure 2:
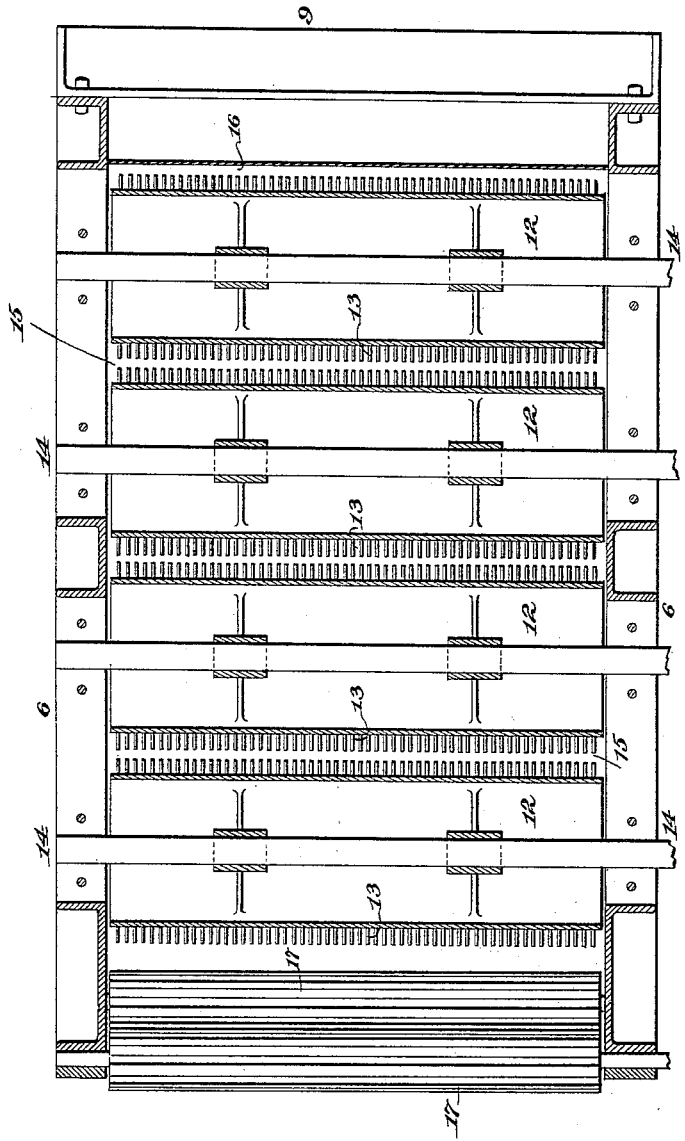
Figure 3:
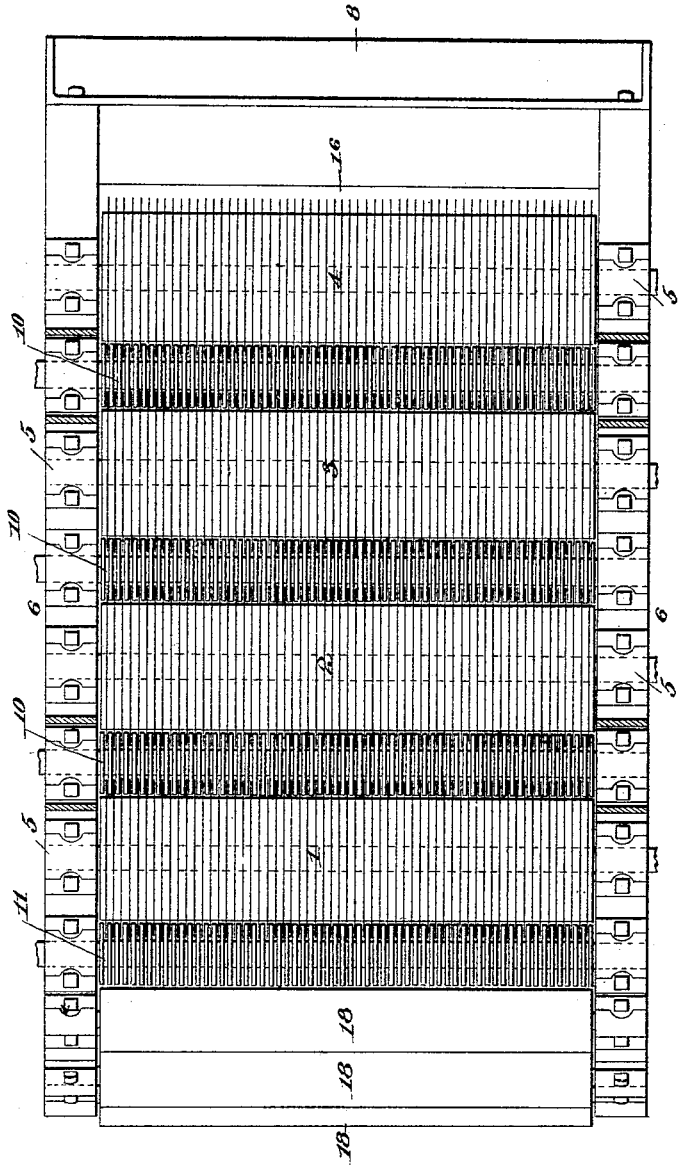
Figure 4:
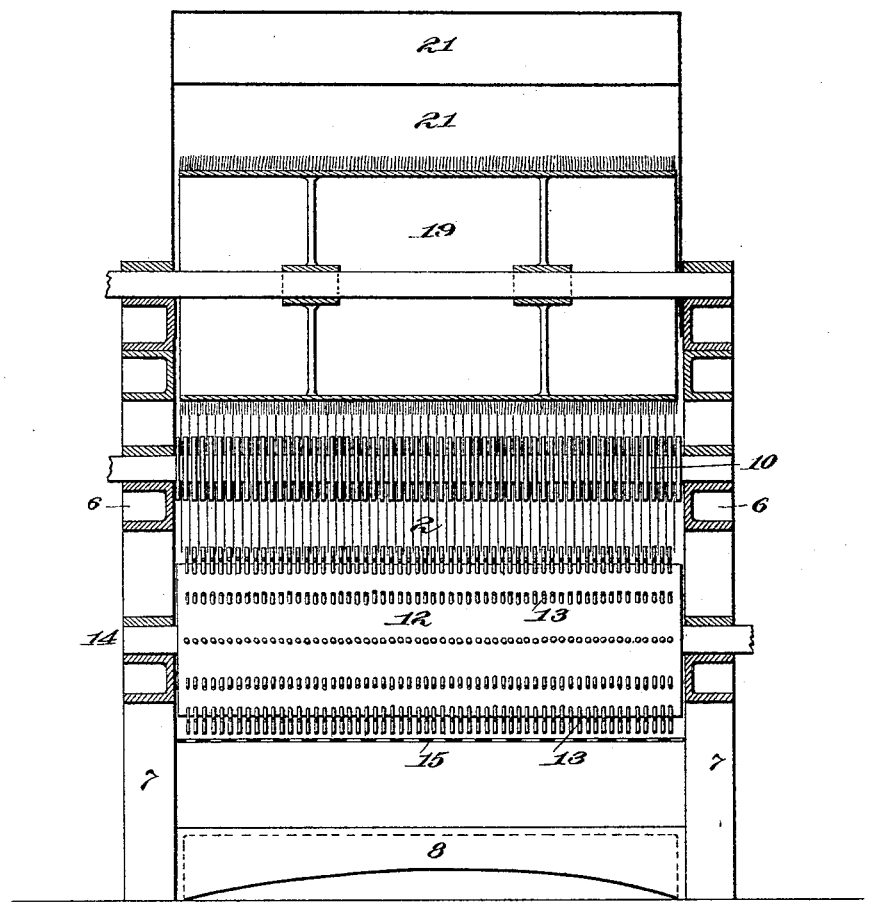

Figure 1 is a longitudinal section of the improved multiple gin; Fig. 2, a section on the line 2 2 of Fig. 1; Fig. 3, a section on the line 3 3 of Fig. 1; Fig. 4, a section on the line 4 4 of Fig. 1.

In all of the above views corresponding parts are represented by the same numerals.

In my improved gin preferably four gangs of saws 1, 2, 3, and 4 are used; but a greater or lesser number of saws may be employed, as will be obvious. The saws are carried in journals 5, mounted on side frames 6 of any suitable construction and having supporting legs or standards 7 and suitable cross-frames 8 and 9. Preferably the saws are mounted in substantially the same horizontal plane; but they may be vertically disposed or arranged at an incline.

Mounted between each pair of saws 1 and 2, 2 and 3, and 3 and 4 is a grooved roller 10, with the grooves of which the said saws coöperate, and mounted at the other side of the saws 1 is a grooved roller 11, with which the said saws coöperate. The grooves in these rollers are slightly larger than the saws in order that the cotton removed by the saws may pass through the same. These rollers rotate in the same direction as the saws and preferably at the same peripheral speed therewith and are used in place of the ordinary slats.

In operation the grooved roller 11 actively coöperates with the saws 1 for the removal of the lint from the seed-cotton. The grooved roller at the left of the saws 2 actively coöperates with those saws for the same purpose. The grooved roller at the left of the saws 3 coöperates with those saws, and the grooved roller at the left of the saws 4 actively coöperates with those saws.

The object of engaging the saws 1, 2, and 3 with the grooved roller at the right thereof is to maintain said rollers always free of cotton, as will be obvious. I do not, however, make any claim to this feature.

Mounted beneath each of the gangs of saws is a feed-roller 12, having spikes 13 in the periphery thereof. The said feed-rollers are carried on shafts mounted in journals 14, secured to the side frames. Beneath each feed-roller and concentric therewith is a perforated stationary apron 15, the perforations in which are sufficiently large for the passage of seed and foreign substances removed from the cotton during the ginning operation.

The feed-rollers 12 are arranged sufficiently close together as to bring the perforated aprons 15 in substantial juxtaposition, whereby the seed-cotton impelled over one of the perforated aprons will be engaged by the adjacent feed-roller. The feed-rollers 12 are arranged immediately beneath the saws, and the spikes thereof preferably overlap the saws, with the exception of the feed-roller at the feeding end of the gin, which preferably is located on a slightly lower plane, as shown.

In order to feed the cotton to the gin, I make use of a feed-chute 16, arranged a short distance below the adjacent gang of saws and between which and said saws the seed-cotton is introduced, being drawn into the ginning-chamber by the rotation of said saws. At the other end of the gin I employ a series of positively-driven rolls 17 and 18, which are arranged sufficiently close together as to prevent cotton from passing in between the same. These rollers all rotate in the same direction as the saws, grooved rollers, and feed-rollers.

To allow for the discharge of seed and foreign substance at the rear end of the gin, the rollers 17 17 are preferably corrugated, as shown, forming pockets therein sufficiently deep to receive the seed and carry the same out of the gin.

In order to remove cotton from the saws, I preferably make use of two brushes 19 and 20, revolving at a higher rate of speed than and in a direction opposite to that of the saw and each cooperating with two of the gangs of saws, as shown. These brushes deliver the cotton removed from the saws into the lint-flues 21 21 in the usual way.

The operation of my improved gin is as follows: The seed-cotton is introduced upon the feed-apron 16 and is immediately drawn into the ginning-chamber beneath the saws by the first gang of saws, which also remove a part of the lint from the seed-cotton. Upon entering the interior of the gin the seed-cotton will fall upon the first feed-roller and be carried by the same in contact with the perforated apron beneath the said feed-roller into engagement with the second feed-roller, by which a portion of it will be carried up into contact with the second gang of saws and a further quantity of lint removed. This operation takes place in connection with the other feed-rollers and saws, the cotton being subjected to successive ginning operations as it passes through the machine and being entirely ginned by the time it reaches the last gang of saws. In the meantime any dust or foreign substances which may be agitated out of the same will pass through the perforated aprons 15, and also any seeds.

When the amount of seed-cotton fed to the gin is small, the successive operation referred to takes place; but if a greater amount of cotton is fed therein the entire space between the saws or ginning-chamber will be completely filled with the seed-cotton, in which case the feed-rollers will tend to constantly agitate the cotton and bring it successively into engagement with the saws.

Should any of the seed be carried through the gin to the rear end thereof, they will be removed by engaging in the pockets of one or both of the rollers 17, by which they will be carried out of the machine, as will be understood.

When a sufficient amount of cotton is fed into the gin to entirely fill the ginning-chamber, it will assume the form of a roll beneath each of the grooved rollers 10 and 11, as in an ordinary cotton-gin, each roller being rotated by its engagement with two of the saw-gangs and two of the feed-rollers, whereby successive portions of the seed-cotton will be presented to the action of the saws. At the same time the teeth or spikes on the feed-rollers carry the cotton in a much slower movement lengthwise back and forth in the ginning chamber and not only thoroughly agitate it, so as to remove dirt and foreign substances, but thereby increase the efficiency of the gin.

The cotton removed by the saws is swept off of the same by the brushes in the usual way and impelled by the draft through the lint-flues 21.

The saws, grooved rollers, feed-rollers, and the rollers 17 and 18 are all driven in the same direction and preferably at the same peripheral speed. The brushes are driven in the opposite direction and at a very much higher rate of rotation. Any suitable arrangement of belting or other gearing devices may be employed for operating these elements.

Having now described my invention, what I claim as new therein, and desire to secure by Letters Patent, is as follows:

1. In a multiple cotton-gin, the combination with a plurality of gangs of saws mounted in substantially the same plane, and a device cooperating with each gang of saws and having a series of contracted slots in which the saws work and which prevents the passage of the seeds, of a series of feed-rollers one for each gang of saws each of a diameter substantially equal to that of the saws and mounted adjacent to the saws with the axis of each on a line passing through the axes of the corresponding saws and perpendicular to the plane of the saws, and between which and the saws and the slotted devices a series of ginning-chambers will be formed, substantially as set forth.

2. In a multiple cotton-gin, the combination with a plurality of gangs of saws mounted in substantially the same plane, and a device cooperating with each gang of saws and having a series of contracted slots in which the saws work and which prevents the passage of the seeds, of a series of spiked feed-rollers one for each gang of saws each of a diameter substantially equal to that of the saws and mounted adjacent to the saws with the axis of each on a line passing through the axes of the corresponding saws and perpendicular to the plane of the saws, and between which and the saws and the slotted devices a series of ginning-chambers will be formed, substantially as set forth.

3. In a multiple cotton-gin, the combination with a plurality of gangs of saws mounted in substantially the same horizontal plane, and a device cooperating with each gang of saws and having a series of contracted slots in which the saws work and which prevents the passage of the seeds, of a series of feed-rollers one for each gang of saws mounted adjacent to the same in a horizontal plane, the feed-rollers being of substantially the same diameter as the saws, and each feed-roller being mounted vertically below the corresponding saws, and between which feed-rollers and the saws and the slotted devices a series of ginning-chambers will be formed, substantially as set forth.

4. In a multiple cotton-gin, the combination with a plurality of gangs of saws mounted in substantially the same horizontal plane, and a device coöperating with each gang of saws and having a series of contracted slots in which the saws work and which prevents the passage of the seeds, of a series of spiked feed-rollers one for each gang of saws mounted adjacent to the same in a horizontal plane, the feed-rollers being of substantially the same diameter as the saws, and each feed-roller being mounted vertically below the corresponding saws, and between which feed-rollers and the saws and the slotted devices a series of ginning-chambers will be formed, substantially as set forth.

5. In a multiple cotton-gin, the combination with a plurality of gangs of saws mounted in substantially the same plane, and a device coöperating with each gang of saws and having a series of contracted slots in which the saws work and which prevents the passage of the seeds, of a series of feed-rollers one for each gang of saws each of a diameter substantially equal to that of the saws and mounted adjacent to the saws with the axis of each on a line passing through the axes of the corresponding saws and perpendicular to the plane of the saws, and between which and the saws and the slotted devices a series of ginning-chambers will be formed, and a perforated stationary apron beneath each feed-roller and concentric therewith, substantially as set forth.

6. In a multiple cotton-gin, the combination with a plurality of gangs of saws mounted in substantially the same plane, and a device coöperating with each gang of saws and having a series of contracted slots in which the saws work and which prevents the passage of the seeds, of a series of spiked feed-rollers one for each gang of saws each of a diameter substantially equal to that of the saws and mounted adjacent to the saws with the axis of each on a line passing through the axes of the corresponding saws and perpendicular to the plane of the saws, and between which and the saws and the slotted devices a series of ginning-chambers will be formed, and a perforated stationary apron beneath each feed-roller and concentric therewith, substantially as set forth.

7. In a multiple cotton-gin, the combination with a plurality of gangs of saws mounted in substantially the same plane, and a series of grooved rollers mounted between said gangs of saws and with which the saws coöperate, of a series of feed-rollers one for each gang of saws each of a diameter substantially equal to that of the saws and mounted adjacent to the saws with the axis of each on a line passing through the axes of the corresponding saws and perpendicular to the plane of the saws, and between which and the saws and the slotted devices a series of ginning-chambers will be formed, and a perforated stationary apron beneath each feed-roller and concentric therewith, substantially as set forth.

8. In a multiple cotton-gin, the combination of a plurality of gangs of saws mounted in substantially the same plane, a series of grooved rollers mounted between said gangs of saws and with which the saws coöperate, a series of spiked feed-rollers, one for each gang of saws, mounted adjacent to the same and between which, the saws and the grooved rollers a series of ginning-chambers will be formed, and a stationary perforated apron beneath each feed-roller and concentric therewith, substantially as set forth.

This specification signed and witnessed this 3d day of May, 1897.

T. F. HUTCHINSON.

Witnesses:
 M. SWENSON,
 A. W. WALBURN.